(12) United States Patent  
Tso

(10) Patent No.: US 11,803,108 B2  
(45) Date of Patent: Oct. 31, 2023

(54) ADJUSTMENT MECHANISM AND PROJECTION DEVICE

(71) Applicant: Coretronic Corporation, Hsin-Chu (TW)

(72) Inventor: Chia-Ching Tso, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/458,570

(22) Filed: Aug. 27, 2021

(65) Prior Publication Data

US 2022/0066298 A1 Mar. 3, 2022

(30) Foreign Application Priority Data

Sep. 3, 2020 (CN) .......................... 202021896866.2

(51) Int. Cl.  
*G03B 21/14* (2006.01)

(52) U.S. Cl.  
CPC ................................ *G03B 21/142* (2013.01)

(58) Field of Classification Search  
CPC .... G03B 21/14; G03B 21/142; G03B 21/145; G03B 33/12  
USPC ................................... 353/100; 359/81, 813  
See application file for complete search history.

(56) References Cited

U.S. PATENT DOCUMENTS

| 4,408,830 A | * | 10/1983 | Wutherich | G02B 7/004 |
| | | | | 359/813 |
| 2013/0107379 A1 | * | 5/2013 | Lee | G02B 7/023 |
| | | | | 359/811 |
| 2018/0259833 A1 | * | 9/2018 | Takizawa | G03B 21/145 |
| 2021/0223495 A1 | * | 7/2021 | Chen | G02B 7/1821 |

FOREIGN PATENT DOCUMENTS

| TW | 201527823 A | 7/2015 |
| TW | 201539807 A | 10/2015 |

* cited by examiner

*Primary Examiner* — Bao-Luan Q Le  
*Assistant Examiner* — Danell L Owens

(57) ABSTRACT

An adjustment mechanism is adapted to fix and adjust an optical element. The adjustment mechanism includes a housing, a fixing member and an elastic member. The housing is adapted for accommodate the optical element, and has a side wall, and the side wall has a locking portion protruding outward. The fixing member is disposed beside the side wall. The fixing member has a joint portion. The elastic member is disposed between the fixing member and the housing. The elastic member has a first end and a second end relative to the first end. The first end is combined with the joint portion, and the second end is abutted against the side wall. The adjusting part passes through the opening and connects with the locking portion. A projection device is further provided. The adjustment mechanism and the projection device of the invention may improve the assembly process and reduce costs.

11 Claims, 4 Drawing Sheets

ADJUSTMENT MECHANISM AND PROJECTION DEVICE

CROSS-REFERENCE TO RELATED APPLICATION

This application claims the priority benefit of China application 202021896866.2, filed on 2020 Sep. 3. The entirety of the above-mentioned patent application is hereby incorporated by reference herein and made a part of this specification.

FIELD OF THE INVENTION

The invention relates to an adjustment mechanism, and more particularly to an adjustment mechanism for optical elements and a projection device using the adjustment mechanism.

BACKGROUND OF THE INVENTION

The type of light source used in the projection device has evolved from ultra-high pressure mercury lamp (UHP lamp), light emitting diode (LED) to laser diode (LD) with the market demand for brightness, color saturation, service life, non-toxic environmental protection and the like of the projection device.

Various optical elements are disposed in the projection device to converge, split or transmit light. When disposing the optical element, the sheet metal, spring and other elements are combined into an adjustment mechanism to adjust the focal length of the optical element to the light. However, in the known adjustment mechanism, the spring may be ejected during the assembly process, causing damage or contamination, and ultimately causing the wear of the parts and the decrease of the product yield. In addition, since the spring is not easy to locate, it leads to increase the working time of assembly.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides an adjustment mechanism, which is adapted to fix and adjust optical elements and may improve the assembly process and reduce costs.

The invention provides a projection device, which may adjust optical elements, improve assembly process and reduce costs.

Other advantages and objects of the invention may be further illustrated by the technical features broadly embodied and described as follows.

In order to achieve one or a portion of or all of the objects or other objects, an adjustment mechanism provided in an embodiment of the invention is adapted to fix and adjust optical elements. The adjustment mechanism includes a housing, a fixing member and an elastic member. The housing is adapted for accommodate the optical element and has a side wall. The fixing member is disposed beside the side wall. The fixing member has a joint portion. The elastic member is disposed between the fixing member and the housing. The elastic member has a first end and a second end relative to the first end. The first end is combined with the joint portion, and the second end abuts against the side wall.

In order to achieve one or a portion of or all of the objects or other objects, a projection device provided in an embodiment of the invention includes an optical module, a light source, a light valve and a projection lens. The optical module includes an optical element and the above-mentioned adjustment mechanism. The light source is adapted to provide an illumination beam. The light valve is disposed on a transmission path of the illumination beam and is adapted to convert the illumination beam into an image beam. The projection lens is disposed on a transmission path of the image beam and is adapted to project the image beam out of the projection device. The optical element is disposed on the transmission path of the illumination beam or the image beam.

In the adjustment mechanism of the invention, the first end of the elastic member is combined with the joint portion of the fixing member. Therefore, the problem of difficult positioning of the elastic member during the assembly process may be avoided, and the work time of assembly may be reduced. Moreover, when the second end of the elastic member is abutted against the side wall of the housing, since the first end is already combined to the joint portion of the fixing member, the elastic member may also be prevented from ejecting out during the assembly process, causing damage or contamination. On the whole, the adjustment mechanism of the invention may improve the assembly process and reduce costs. Since the projection device of the invention uses the above-mentioned adjustment mechanism, the assembly process may be improved and costs may be reduced.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
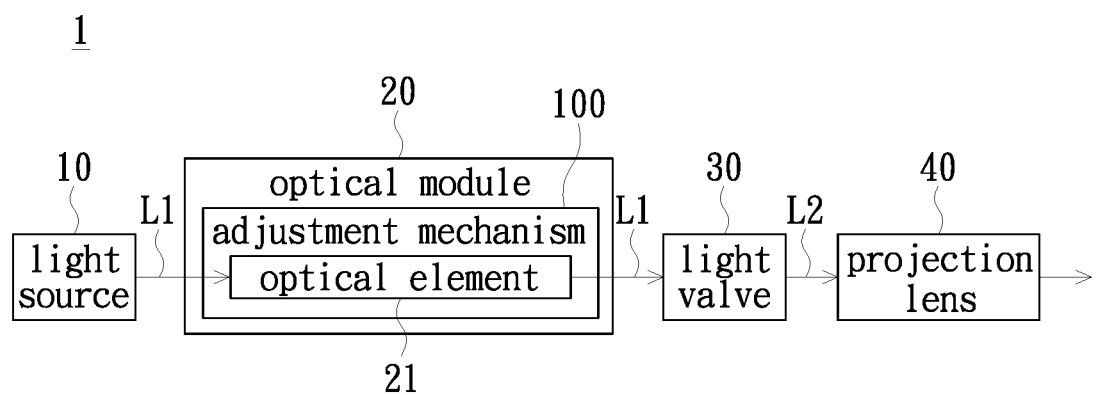
FIG. 1 is a block diagram of a projection device of one embodiment of the invention.

FIG. 1 is a block diagram of a projection device of one embodiment of the invention. Referring to FIG. 1, the projection device 1 of the embodiment includes a light source 10, an optical module 20, a light valve 30, and a projection lens 40. The light source 10 is adapted to provide an illumination beam L1. The light valve 30 is disposed on a transmission path of the illumination beam L1 and is adapted to convert the illumination beam L1 into an image beam L2. The projection lens 40 is disposed on a transmission path of the image beam L2 and is adapted to project the image beam L2 onto a screen or a wall (not shown), and then form an image frame on the screen or the wall. In the embodiment, the optical module 20 is disposed on a transmission path of the illumination beam L1 as an example, but is not limited thereto. In another embodiment, the optical module 20 may also be disposed on a transmission path of the image beam L2.

The light source 10 is, for example, an excitation light source, and the excitation light source may be, for example, a diode module including at least one light emitting diode or a laser diode chip, wherein at least one light emitting diode or laser diode may be arranged in a matrix. The excitation light source may provide an excitation beam, but is not limited thereto. The illumination beam L1 may include the excitation beam.

The optical module 20 includes an optical element 21 and an adjustment mechanism 100, and the adjustment mechanism 100 is adapted to fix and adjust the optical element 21. The invention does not particularly limit the type of the optical element 21, as long as it can perform functions such as converging, splitting or transmitting light.

The light valve 30 may be a transmissive light valve or a reflective light valve, in which the transmissive light valve may be a transmissive liquid crystal panel, and the reflective light valve may be a digital micro-mirror device (DMD), a liquid crystal display (LCD), a liquid crystal on silicon panel (LCoS panel), a transparent liquid crystal panel, an electro-optical modulator, a magneto-optic modulator, and an acousto-optic modulator (AOM), but is not limited thereto.

The projection lens 40 includes, for example, a combination of one or more optical lenses having diopter, such as various combinations of non-planar lenses including biconcave lenses, lenticular lenses, meniscus lenses, convex and concave lenses, plano-convex lenses, and plano-concave lenses. In an embodiment, the projection lens 40 may also include a planar optical lens. The invention does not limit the type and kind of projection lens 40.

Hereinafter, the detailed structure and implementation of the optical module 20 shown in FIG. 1 will be further described.

Figure 2:
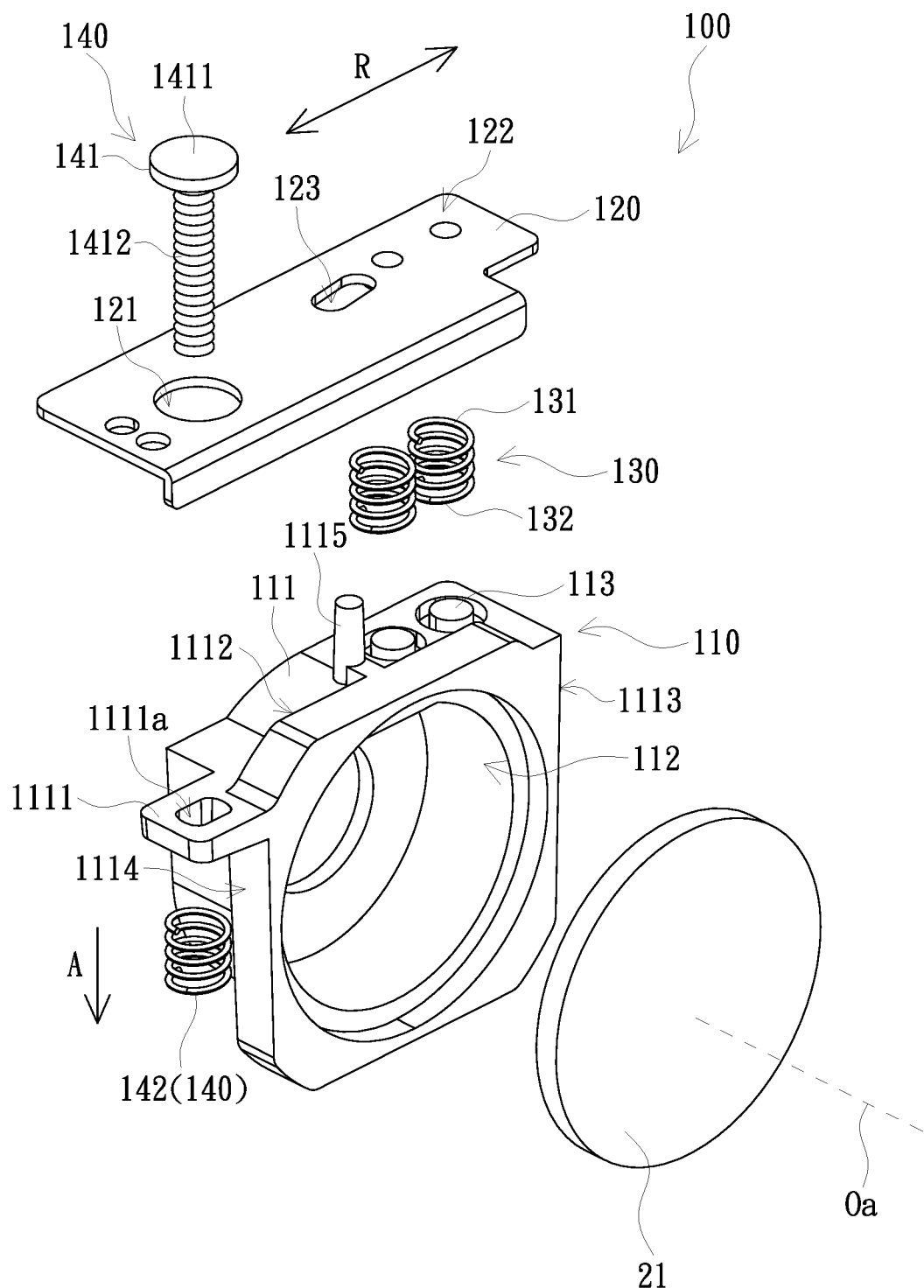
FIG. 2 is an exploded schematic diagram of an optical module of one embodiment of the invention.

FIG. 2 is an exploded schematic diagram of an optical module of one embodiment of the invention. Referring to FIG. 2, the optical module 20 of the embodiment includes an optical element 21 and an adjustment mechanism 100. The adjustment mechanism 100 includes a housing 110, a fixing member 120, an elastic member 130 and an adjusting member 140. The housing 110 is adapted to accommodate the optical element 21. The housing 110 has a side wall 111 and an opening 112, and the side wall 111 has a locking portion 1111 protruding outward. The optical element 21 is accommodated in the opening 112, and the opening 112 is, for example, corresponding to the shape of the optical element 21. In the embodiment, the opening 112 is, for example, circular, but not limited thereto. The fixing member 120 is disposed beside the side wall 111. The fixing member 120 has an opening hole 121 and a joint portion 122, and the opening hole 121 is opposite to the locking portion 1111. The fixing member 120 includes, for example, sheet metal, metal parts and plastic parts. The invention does not limit the material and type of the fixing member 120. The elastic member 130 is disposed between the fixing member 120 and the housing 110. The elastic member 130 includes, for example, a spring and a spring plate. In the embodiment, a spring is taken as an example, but is not limited thereto. The quantity of the elastic members 130 in FIG. 2 is two as an example, but the invention does not particularly limit the quantity of the elastic members 130. The elastic member 130 has a first end 131 and a second end 132 opposite to the first end 131. The first end 131 is combined with the joint portion 122, and the second end 132 abuts against the side wall 111. In order to clearly show the arrangement of the elements in FIG. 2, the fixing member 120 and the elastic member 130 are drawn separately. However, in fact, the elastic member 130 should be fixed to the fixing member 120 by combining the first end 131 with the joint portion 122 of the fixing member 120. In the embodiment, the fixing member 120 and the elastic member 130 are two different elements combined together, but not limited thereto. In another embodiment, the fixing member 120 and the elastic member 130 may also be integrally formed.

In addition, the adjusting member 140 passes through and is rotatably fixed to the opening hole 121, and the adjusting member 140 is locked to the locking portion 1111. The elastic member 130 abuts or connects between the side wall 111 and the fixing member 120. By using the adjusting member 140 in cooperation with the elastic member 130, the housing 110 may rotate within a preset angle range with the optical axis Oa of the optical element 21 as a rotation axis. The preset angle range is, for example, plus or minus 5 degrees to adjust the light concentration of the optical element 21, thereby achieving the purpose of adjusting the brightness of the projector.

In the embodiment, the adjusting member 140 includes, for example, an adjusting screw 141 and a spring 142, but it is not limited thereto. The adjusting screw 141 has a head 1411 and a rod 1412. The spring 142 is sleeved on the rod 1412 of the adjusting screw 141. Specifically, the rod 1412 passes through the opening hole 121 and is locked to the locking portion 1111, and the locking portion 1111 is disposed between the head 1411 of the adjusting screw 141 and the spring 142. The locking portion 1111 has, for example, a locking hole 1111a, and the rod 1412 is locked to the locking hole 1111a, but it is not limited thereto. In the embodiment, the spring 142 is positioned and abutted against between the locking portion 1111 and the body (not shown). The adjusting member 140 may rotate the adjusting screw 141 in a rotating direction, which may increase the distance between the locking portion 1111 and the fixing member 120, so that the locking portion 1111 drives the housing 110 to rotate within the preset angle range with the optical axis Oa as the rotation axis (that is, let the locking portion 1111 swing downward along a first direction A). Or, rotating the adjusting screw 141 in another rotation direction may shorten the distance between the locking portion 1111 and the fixing member 120. The spring 142 pushes the locking portion 1111, so that the locking portion 1111 drives the housing 110 to rotate within the preset angle range with the optical axis Oa as the rotation axis (that is, let the locking portion 1111 swing upward along the first direction A).

The side wall 111 has a first side 1112, a second side 1113, and a third side 1114 all disposed around the optical axis Oa. The first side 1112 faces the fixing member 120, the second side 1113 is opposite to the third side 1114, and the first side 1112 is connected to the second side 1113 and the third side 1114. The position where the second end 132 of the elastic member 130 abuts against the side wall 111 is, for example, on the first side 1112 adjacent to the second side 1113, and the locking portion 1111 is, for example, on the third side 1114 adjacent to the first side 1112, but is not limited thereto. In this configuration, the optical axis Oa of the optical element 21 is located between the elastic member 130 and the locking portion 1111 (in the embodiment, the elastic member 130 is located on the first side 1112 and the locking portion 1111 is located on the third side 1114) when viewed from the first direction A. When the adjusting member 140 is adjusted so that the locking portion 1111 drives the housing 110 to rotate, the elastic member 130 on the other side may be used to balance the stress received by the housing 110, which may improve the structural stability and prevent the housing 110 from being damaged due to uneven forces.

Figure 3:
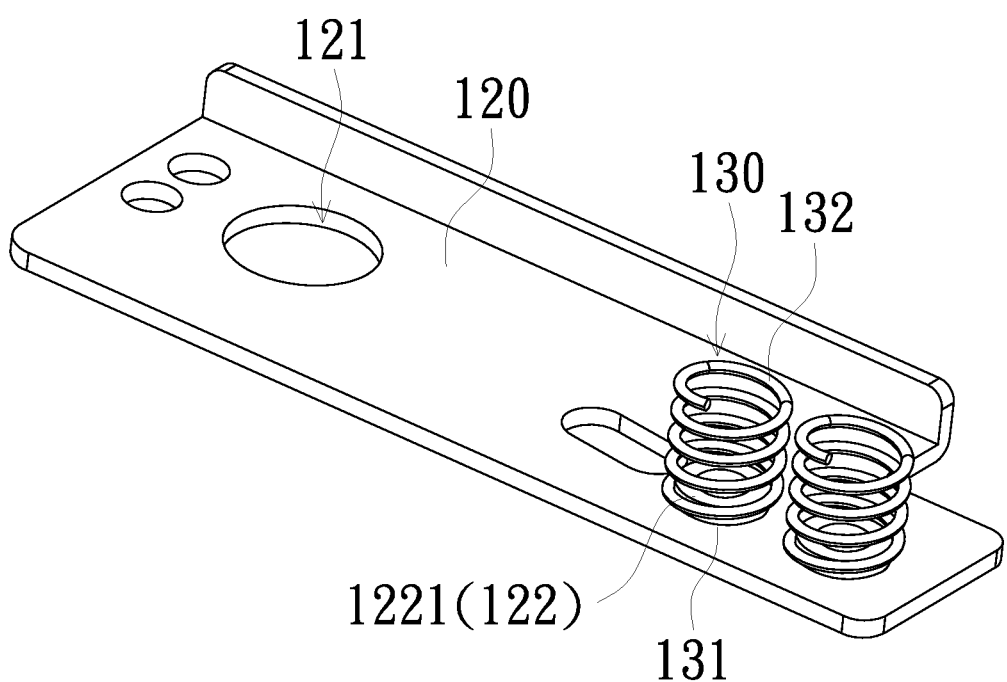
FIG. 3 is a three-dimensional schematic diagram of an elastic member combined with a fixing member of one embodiment of the invention.

FIG. 3 is a three-dimensional schematic diagram of an elastic member combined with a fixing member of one embodiment of the invention. Referring to FIG. 2 and FIG. 3, the joint portion 122 of the embodiment includes, for example, a collar 1221. The first end 131 of the elastic member 130 is sleeved on and fixed to the collar 1221, and the annular portion of the first end 131 is clamped on a periphery of the collar 1221. The housing 11 further has, for example, a positioning column 113 disposed on the first side 1112 of the side wall 1110. The quantity of the positioning columns 113 is the same as the quantity of the elastic members 130, and the arrangement position of the positioning column 113 corresponds to the elastic member 130. When the elastic member 130 is a spring, the second end 132 of the elastic member 130 is sleeved on the positioning column 113. In addition, the positioning column 113 may be further disposed to pass through the collar 1221 of the fixing member 120, thereby avoiding possible displacement or ejection problems when the spring (elastic member 130) is compressed.

In the projection device 1 of the embodiment, the optical module 20 includes an adjustment mechanism 100 adapted to fix and adjust the optical element 21. The first end 131 of the elastic member 130 of the adjustment mechanism 100 is combined with the joint portion 122 of the fixing member 120. Therefore, the problem of difficult positioning of the elastic member 130 during the assembly process may be avoided, and the work time of assembly may be reduced. Moreover, when the second end 132 of the elastic member 130 is abutted against the side wall 111 of the housing 110, since the first end 131 is already combined to the joint portion 122 of the fixing member 120, the elastic member 130 may also be prevented from ejecting out during the assembly process, causing damage or contamination. On the whole, the adjustment mechanism 100 of the invention may improve the assembly process and reduce costs.

In the embodiment, the side wall 111 further has a limiting column 1115 (disposed on the first side 1112 in FIG. 2), for example, and the fixing member 120 further has a limiting groove 123. The limiting column 1115 is sleeved in the limiting groove 123, and the limiting column 1115 extends along a tangential direction R (the tangential direction close to the limiting column 1115 when the housing 110 rotates) in the limiting groove 123. The function of the limiting column 1115 and the limiting groove 123 is to prevent the housing 110 from moving in a direction parallel to the optical axis Oa. In addition, since the limiting groove 123 extends along the tangential direction R, the limiting column 1115 and the limiting groove 123 may still move relatively in the tangential direction R without affecting the rotation of the housing 110. The quantity of the limiting columns 1115 and the quantity of the limiting grooves 123 each are one as an example, but not limited thereto, and the invention does not limit the quantity of the above-mentioned elements.

Figure 4:
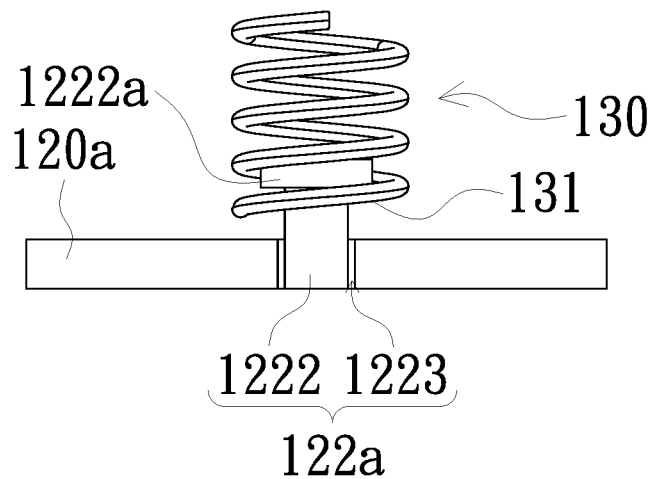
FIG. 4 is a schematic diagram of an elastic member combined with a fixing member of another embodiment of the invention.

FIG. 4 is a schematic diagram of an elastic member combined with a fixing member of another embodiment of the invention. Referring to FIG. 4, the structure and advantages of the joint portion 122a of the embodiment are similar to those of the joint portion 122 of FIG. 3, and only the main differences of the structure will be described below. The joint portion 122a of the fixing member 120a of the embodiment includes, for example, a locking screw 1222 and a screw hole 1223. The locking screw 1222 has a head 1222a, the locking screw 1222 (a rod of the locking screw 1222) is locked in the screw hole 1223, and the head 1222a clamps and fixes the first end 131 of the elastic member 130 between the locking screw 1222 and the screw hole 1223.

Figure 5:
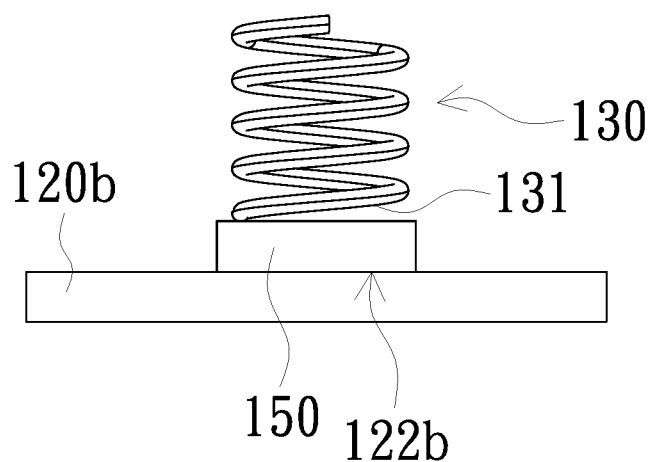
FIG. 5 is a schematic diagram of an elastic member combined with a fixing member of another embodiment of the invention.

FIG. 5 is a schematic diagram of an elastic member combined with a fixing member of another embodiment of the invention. Referring to FIG. 5, the structure and advantages of the joint portion 122b of the embodiment are similar to those of the joint portion 122 of FIG. 3, and only the main differences of the structure will be described below. The adjustment mechanism 100 of the embodiment further includes an adhesive layer 150 disposed between the joint portion 122b and the first end 131 of the elastic member 130. Specifically, the adhesive layer 150 includes glue, solder or hot melts glue, etc., and the adhesive layer 150 connects the first end 131 of the elastic member 130 to the bonding portion 122b by means of, for example, adhesion, welding or hot melt, but are not limited thereto.

The specific structure of the combining manner between the elastic member 130 and the fixing member 120 of the invention is not limited to the above-mentioned embodiments. The above-mentioned embodiments may be used together for the combination, or other methods may be selected according to different design requirements. For example, the first end 131 of the elastic member 130 may be connected to a fixing sheet by the adhesive layer 150, and then the fixing sheet is clamped and fixed between the locking screw 1222 and the screw hole 1223, thereby indirectly completing the combination between the elastic member 130 and the fixing member 120.

In summary, in the adjustment mechanism of the invention, the first end of the elastic member is combined with the joint portion of the fixing member. Therefore, the problem of difficult positioning of the elastic member during the assembly process may be avoided, and the work time of assembly may be reduced. Moreover, when the second end of the elastic member is abutted against the side wall of the housing, since the first end is already combined to the joint portion of the fixing member, the elastic member may also be prevented from ejecting out during the assembly process, causing damage or contamination. On the whole, the adjustment mechanism of the invention may improve the assembly process and reduce costs. After the assembly is completed, the elastic member may be used to balance the stress balance the stress received by the housing when the adjusting member is adjusted to make the housing rotate, which may improve the structural stability and prevent the housing from being damaged due to uneven forces. Since the projection device of the invention uses the above-mentioned adjustment mechanism, the assembly process may be improved and costs may be reduced.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first side, the second side, the third side, the first end, the second end and the first direction are only used for distinguishing various elements and do not limit the number of the elements.

What is claimed is:

1. An adjustment mechanism, adapted to fix and adjust an optical element, and comprising:
   a housing, adapted to accommodate the optical element and having a side wall;
   a fixing member, disposed beside the side wall and having a joint portion;
   an elastic member, disposed between the fixing member and the housing, wherein the elastic member has a first end and a second end opposite to the first end, the first end is combined with the joint portion, and the second end abuts against the side wall; and
   an adjusting member, wherein the side wall has a locking portion protruding outward, the fixing member has an opening hole, the opening hole is opposite to the locking portion, the adjusting member passes through the opening hole and is connected to the locking portion, and the adjusting member is adapted to make the housing rotate within a preset angle range along an optical axis of the optical element.

2. The adjustment mechanism according to claim 1, wherein the adjusting member comprises an adjusting screw and a spring, the adjusting screw has a head and a rod, the spring is sleeved on the rod of the adjusting screw, the rod passes through the opening hole and is locked to the locking portion, and the locking portion is disposed between the head of the adjusting screw and the spring.

3. The adjustment mechanism according to claim 1, wherein the side wall has a limiting column, the fixing member further has a limiting groove, the limiting groove extends along a tangential direction close to the limiting column when the housing rotates, and the limiting column is located in the limiting groove.

4. The adjustment mechanism according to claim 1, wherein the joint portion is a collar, and the first end of the elastic member is sleeved on and fixed to the collar.

5. The adjustment mechanism according to claim 1, wherein the joint portion comprises a locking screw and a screw hole, the locking screw has a head, the locking screw is locked in the screw hole, and the head clamps and fixes the first end of the elastic member between the locking screw and the screw hole.

6. The adjustment mechanism according to claim 1, wherein the elastic member comprises a spring and a spring plate.

7. The adjustment mechanism according to claim 1, wherein the fixing member and the elastic member are integrally formed.

8. The adjustment mechanism according to claim 1, wherein viewing along an extending direction of the adjusting member, an optical axis of the optical element is located between the elastic member and the locking portion.

9. The adjustment mechanism according to claim 1, wherein the housing further has a positioning column, the elastic member is sleeved on the positioning column, and the positioning column is disposed to pass through the collar of the fixing member.

10. An adjustment mechanism, adapted to fix and adjust an optical element, and comprising:
- a housing, adapted to accommodate the optical element and having a side wall;
- a fixing member, disposed beside the side wall and having a joint portion;
- an elastic member, disposed between the fixing member and the housing, wherein the elastic member has a first end and a second end opposite to the first end, the first end is combined with the joint portion, and the second end abuts against the side wall; and
- an adhesive layer, disposed between the joint portion and the first end of the elastic member.

11. A projection device, comprising:
- an optical module, comprising an optical element and an adjustment mechanism, wherein the adjustment mechanism is adapted to fix and adjust the optical element, and the adjustment mechanism comprises:
  - a housing, adapted to accommodate the optical element and having a side wall;
  - a fixing member, disposed beside the side wall and having a joint portion;
  - an elastic member, disposed between the fixing member and the housing, wherein the elastic member has a first end and a second end opposite to the first end, the first end is combined with the joint portion, and the second end abuts against the side wall; and
  - an adjusting member, wherein the side wall has a locking portion protruding outward, the fixing member has an opening hole, the opening hole is opposite to the locking portion, the adjusting member passes through the opening hole and is connected to the locking portion, and the adjusting member is adapted to make the housing rotate within a preset angle range along an optical axis of the optical element;
- a light source, adapted to provide an illumination beam;
- a light valve, disposed on a transmission path of the illumination beam and adapted to convert the illumination beam into an image beam; and
- a projection lens, disposed on a transmission path of the image beam and adapted to project the image beam out of the projection device,
wherein the optical element is disposed on the transmission path of the illumination beam or the image beam.

\* \* \* \* \*